(Model.)
2 Sheets—Sheet 2.
P. C. HUDSON.
BALING PRESS.
No. 249,837. Patented Nov. 22, 1881.
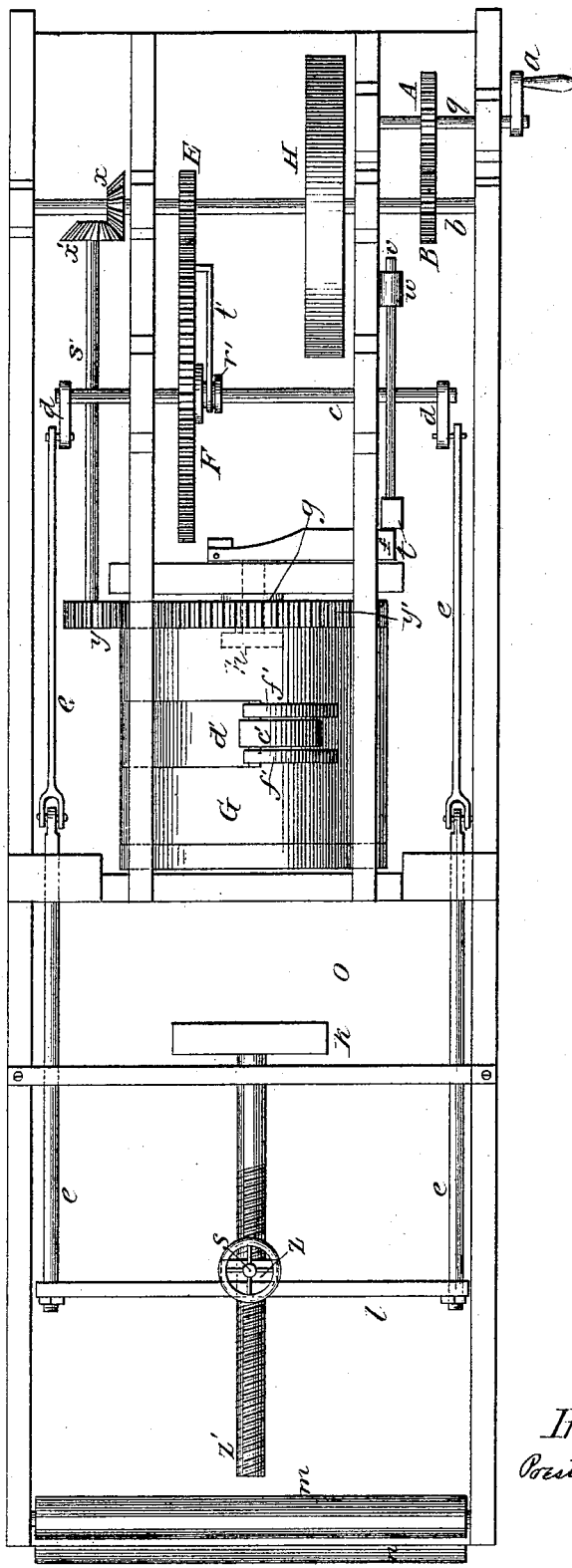
Witnesses:
R. M. Wright
G. S. Sargent
Inventor:
Preston C. Hudson

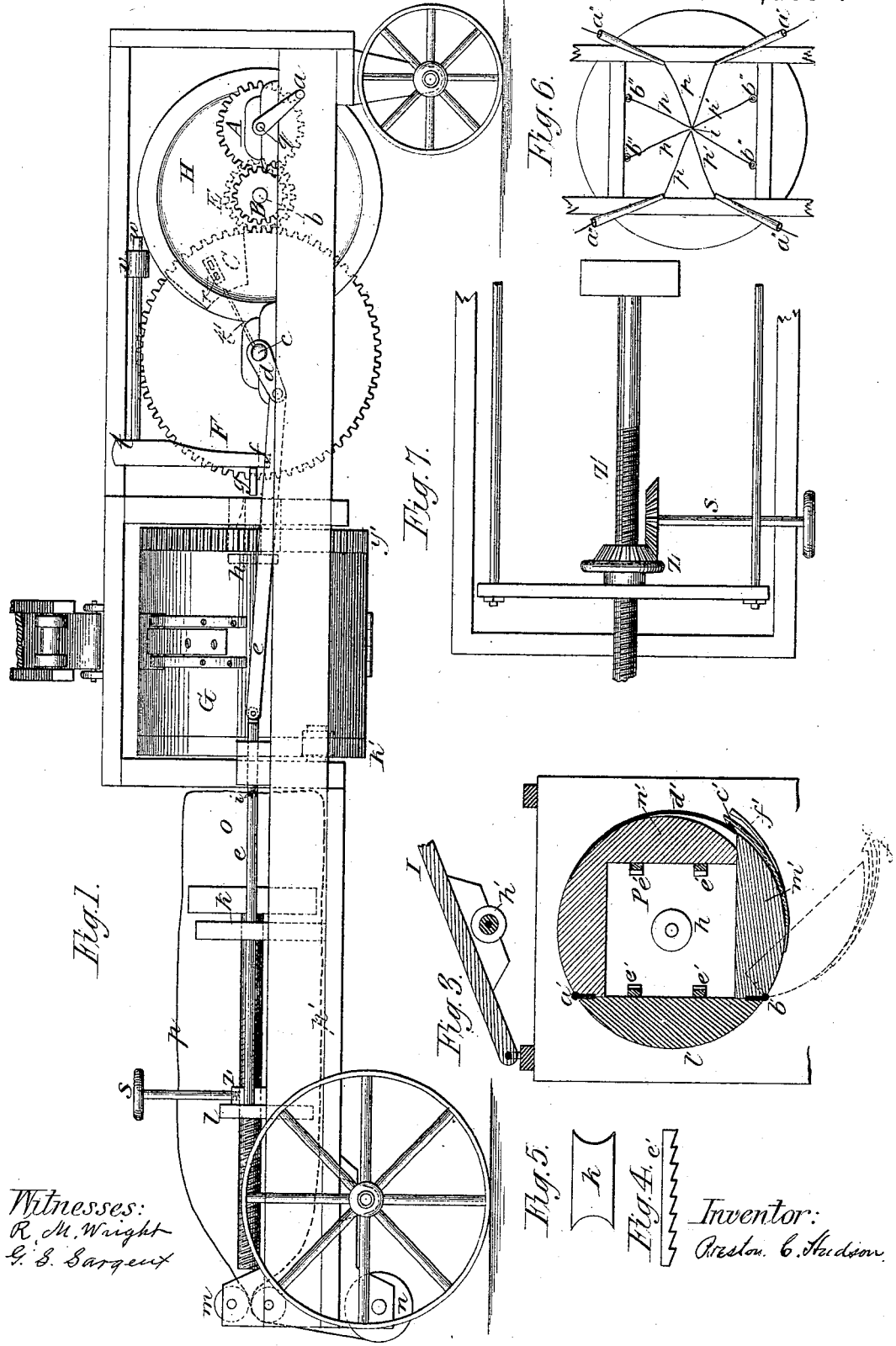

UNITED STATES PATENT OFFICE.

PRESTON C. HUDSON, OF FORT DODGE, IOWA.

BALING-PRESS.

SPECIFICATION forming part of Letters Patent No. 249,837, dated November 22, 1881.

Application filed May 28, 1881. (Model.)

*To all whom it may concern:*

Be it known that I, PRESTON C. HUDSON, of Fort Dodge, in the county of Webster and State of Iowa, have invented a new and useful Improvement in Baling-Presses, of which the following is a specification.

The invention relates to the class of machines used for pressing into bales and binding in bales hay, cotton, straw, and similar commodities.

The objects of my invention are—

First. To provide a portable press operated by such cheap portable machinery that both time and power are economized, and that thus hay may be taken up directly from the field and baled and bound by hand-power.

Second. To provide a stationary press more economical of power and more efficient than those now used. This economy of time and power I accomplish by such machinery that the bale is bound by its own revolving motion, and when bound quickly drops by its own weight. Thus little time is required to bind the bale and remove it when bound, and no power whatever is expended in pushing it out of the way by the succeeding bale, as is the case in many of the best machines now used.

In the accompanying drawings, in which similar letters of reference indicate like parts, Figure 1 is a side elevation. Fig. 2 is a plan. Fig. 3 is a section of the cylinder in which is the bale-chamber, showing the method of opening and closing it. Fig. 4 shows the device within the bale-chamber, for overcoming the elasticity of the compressed commodity when the compressing-piston is withdrawn; and Fig. 5 is a section of the piston-head, made concave on the sides, so that the commodity may be easily forced into the mouth of the bale-chamber. Fig. 6 represents the end of the feed-box o, Fig. 1, in front of and fitting closely to the mouth of the bale-chamber P, which is within the cylinder G. The two wires which bind the upper side of the bale pass from the spools through straight tubes in the covering of the feed-box, and the end of these tubes next to the cylinder is fastened firmly. ($b''$, Fig. 6.) The two wires which bind the lower side of the bale pass through two straight tubes in the floor of the feed-box $b''$, Fig. 6. These four wires $b''$ $b''$ $b''$ $b''$, Fig. 6, pass in almost a straight line from the spools into the bale-chamber; but the wires which bind the two sides of the bale it is necessary to conduct two above and two below the feed-box, so as not to interfere with putting in the hay. When they have reached the end of the feed-box next to the cylinder the two above are brought down and the two below are brought up through short tubes, $a''$ $a''$ $a''$ $a''$, Fig. 6, fastened upon strong upright bars, as shown in the figure. All the wires therefore at the point where they enter the bale-chamber pass through firmly-fixed supports, two upon each of the four sides. After the wires have all been brought together at $i$ and twisted so as to form a net before the mouth of the bale-chamber, and the hay is pressed into the chamber in the manner described, the wires are stretched along the sides of the bale in the positions indicated by these supports, guided by the end of the bale as it moves forward. Fig. 7 represents more fully the device for quickly shortening or lengthening the compressing-piston, as may be desired. It may thus be drawn back so far that in its forward movement it will not enter the bale-chamber, and thus it may be permitted to continue its motion while the cylinder revolves. A thread is cut upon the end of the piston $z'$, and the nut $z$ is turned by the bevel-wheels on the hand-wheel shaft $s$.

In Figs. 1 and 2, $a$ is the crank to which the hand-power is applied. When other power is to be used it may be applied by cog-wheel or pulley instead of this crank.

A is a cog-wheel upon the crank-shaft $q$.

B is a cog-wheel upon the shaft $b$, which engages with A.

H is a heavy fly-wheel, and E is a small cog-wheel upon the same shaft $b$.

F is a large cog-wheel upon the shaft $c$, which engages with E.

C is a segment of the wheel F, made movable toward and from the center upon the lugs $r$.

$t'$ is a rod connecting the movable segment C with $r'$, which is a collar around and movable upon the shaft $c$.

$d$ $d$ are cranks upon the end of the shaft $c$.

G is the revolving cylinder, in which is the bale-chamber P, Fig. 3.

$h$ is a disk at the head of the bale-chamber, upon a piston which passes through the head of the cylinder and through the bulk-head and presses upon the foot of the upright lever $t\,f$.

$t\,v$ is a horizontal lever bolted to the upright lever, and $w$ is a movable weight upon it.

Fig. 5 represents the concave head of the compressing-piston $k$.

$e\,e$ are connecting-rods, connecting the cranks $d$ with the cross-bar $l$.

$n$ is a roller upon which the wire is coiled for binding.

$m$ are two friction-rollers through which the eight wires are passed.

$p$ are four wires passing through pipes over the piston into the mouth of the compression-chamber, and $p'$ are four wires passing under the piston. All the wires are conducted by the pipes to their proper place for entering the bale-chamber on the top, bottom, and sides, and are brought together and twisted at $i$ in the mouth of the chamber.

$o$ is the feed-box, into which the commodity is thrust from either side.

$x$, Fig. 2, is a bevel-wheel upon the shaft $b$.

$x'$ is a bevel-wheel upon the shaft $s'$, which may be engaged with $x$ at pleasure.

$y$ is a cog-wheel upon the shaft $s'$, which engages with the cogs around the head of the cylinder $y'$. The cylinder G is supported at its head upon the journal $g$, and at its mouth the end $k'$ rests upon rollers underneath. In Fig. 3 the dotted lines show a section of the cylinder when closed. The portions of the cylinder $l'$ and $m'$, which form two sides of the bale-chamber between the head $y'$ and the end $k'$, are made separate, and are hung in their places upon hinges $a'$ and $b'$, Fig. 3.

$e'$, Figs. 3 and 4, are pieces attached lengthwise to the sides of the bale-chamber, having notches upon their inner surface so made that they will receive the commodity when forced into the chamber and hold it when the compressing-piston is withdrawn.

$d'$ is a wide spring fastened upon the body of the cylinder, having a catch at its end.

$c'$ is a narrow latch or hook, fastened firmly upon the swinging portion of the cylinder, engaging with $d'$ at the middle of the catch when the cylinder is closed.

$f'\,f'$ are straight springs fastened at the sides of the latch $c'$, and when the cylinder is closed they extend over the catch on the spring $d'$.

$z$ is a collar through which the compressing-piston passes, and $s$ is a hand-screw which enters this collar by a thread and holds or releases the piston at pleasure. Instead of this hand-screw a ratchet may be used.

The operation of this machine is as follows: When power is applied to the crank $a$ it turns the cog-wheel A. This engages with the cog-wheel B upon the shaft $b$. Motion is thus communicated to the shaft $b$, the fly-wheel H, the cog-wheel E, and the cog-wheel F. Motion is thus communicated to the shaft $c$, the cranks $d$, the connecting-rods $e$, the cross-bar $l$, and the compressing-piston $z'\,k$. Thus the shaft $c$ has a continuous revolution, and drives the compressing-piston $z'\,k$ backward and forward into the mouth of the bale-chamber, with whatever commodity may be thrown into the feed-box $o$ before it. The eight or more binding-wires are, as above stated, all twisted together in the mouth of the bale-chamber. As the hay is forced forward by the piston it strikes the twisted wires and forces them into the chamber, and as the bale is formed the wires are carried along at proper distances apart, two or more above, two or more below, and two or more upon each side of the bale. The end of the bale first strikes the disk $h$, and is held back by the weight $w$ until a sufficient compressing power is applied to raise this weight. When this weight rises it indicates that the bale is formed and ready to be bound. The collar $r'$ is now drawn away from the wheel F, and thus the sliding segment C is withdrawn, so that the cogs upon C do not engage with E, and the motion of the piston is stopped. The shaft $s'$ is then moved by any suitable device so that the bevel-wheels $x$ and $x'$ engage, and the shaft $s'$ and the wheel $y$ are made to revolve. The cog-wheel $y$ communicates motion to the cylinder, and thus the cylinder, the bale-chamber, and the bale within it are made to revolve. By the revolution of the bale in the chamber all the wires are twisted together at the mouth of the chamber at $i$. After four or five revolutions the bale is sufficiently bound by the twisting of the wires over its end, and there is also sufficient twist to form the binding of the end of the succeeding bale. Hence the twisted wires are cut by any suitable device in the middle of the twist. Thus the bale remains bound and the wires are left twisted together, ready to receive the next bale. After the wires have been cut the lever I, Fig. 3, is pressed down by turning the hand-screw $i'$. The double roller $h'$ presses down upon the springs $f'$, Fig. 2. These bear upon the catch $d'$ and force it down until the hook $c'$ is disengaged and the cylinder opens. The bale drops out as the cylinder revolves. After the bale has dropped out the swinging parts of the cylinder $l'$ and $m'$ fall into place as the continued revolution of the cylinder brings them above, and by the weight of $m'$ the hook $c'$ is forced over the catch $d'$. The cylinder is thus emptied and again locked, and the revolution should be stopped by disengaging $x$ and $x'$. C and E may now be engaged by thrusting the collar $r'$ up to the wheel F, and the motion of the compressing-piston is resumed.

I claim—

1. In a baling-press, the revolving bale-chamber P, substantially as described, and for the purposes set forth.

2. In a baling-press, the revolving cylinder G, within which is the compression-chamber, of any desired size and form, substantially as described.

3. In a baling-press, the combination of the notched pieces $e'$ with the sides of the compression-chamber P, substantially as described.

4. In a revolving cylinder, the combination of the parts $n'$, $m'$, and $l'$, the heads $k'$ and $y'$, the hinges $a'$ and $b'$, and the notched pieces $e'$, substantially as described.

5. The combination of the lock-spring $d'$, the hook $c'$, and the springs $f'$, substantially as described.

6. The combination of the disk $h$, the piston $f$, the levers $t\ f$ and $t\ v$, and the weight $w$, substantially as described.

7. The combination of the wheel F, the movable segment C, the lugs $r$, the collar $r'$, and the rod $t'$, substantially as described.

8. The combination of the shafts $b$ and $c$, the fly-wheel H, the wheels E and F, the segment C, lugs $r$, rod $t'$, collar $r'$, and cranks $d$, substantially as described.

9. In a baling-press, the combination of the crank $a$, the cog-wheels A B E F, segment C, fly-wheel H, shafts $q\ b\ c$, cranks $d$, connecting-rods $e$, cross-bar $l$, piston $z'$, collar $z$, ratchet or hand-screw $s$, and concave head $k$, substantially as described.

10. In a baling-press, the combination of roller $n$, friction-rollers $m$, and wires $p\ p'$ with suitable conducting pipes or supports, substantially as described.

11. The combination of shaft $b$, wheels $x$ and $x'$, shaft $s'$, wheel $y$, and the toothed head of the cylinder $y'$, substantially as described.

12. In a baling-press, the concave piston-head $k$, whereby friction at mouth of the bale-chamber is relieved, substantially as described.

13. In a baling-press, the combination of compressing-piston $z'$, collar $z$ and ratchet or hand-screw $s$, whereby the compressing-head $k$ may be driven into the bale-chamber to any extent desired, substantially as described.

14. In a baling-press, the combination of crank $a$, cog-wheels A B E F, fly-wheel H, shafts $q\ b\ c$, cranks $d$, connecting-rods $e$, cross-bar $l$, movable segment C, lugs $r$, rod $t'$, collar $r'$, piston $z'$, collar $z$, hand-screw $s$, concave head $k$, revolving bale-chamber P, notched pieces $e'$, and revolving cylinder G, substantially as described.

15. A self-binding baling-press in which the binding is done by means of wires twisted together by revolutions of the bale, substantially as described.

16. A self-binding baling-press in which the binding-wires are gradually pressed forward into a vacant bale-chamber by the commodity to be bound, and are guided in their proper place along the sides of the bale by means of the end of the bale and the fixed tubes or supports fastened to the stationary feed-box at the mouth of the bale-chamber, substantially as described.

17. In a baling-press, the compressing-piston $z'$, bearing a screw of sufficient length, and a nut through the center of a balance-wheel or hand-wheel, so that the piston may be shortened or lengthened quickly at pleasure, substantially as described.

18. The combination of the compressing-piston $z'$, upon the end of which is cut a long heavy thread, the hand-wheel the center of which forms a nut fitting the screw on the piston, the bevel-wheels, the shaft and hand-wheel $s$, all within suitable frame-work, substantially as described.

19. A baling-press having a horizontal revolving bale-chamber, one or more sides of which are hung upon hinges, and from which the bale drops by gravity while the chamber revolves, substantially as described.

PRESTON C. HUDSON.

Witnesses:
MYRON H. FRENCH,
J. W. HAMILTON.